United States Patent [19]
Witzigreuter et al.

[11] Patent Number: 5,891,589
[45] Date of Patent: Apr. 6, 1999

[54] METHOD AND APPARATUS FOR JOINING METAL-AIR CELLS

[75] Inventors: John D. Witzigreuter, Dallas; Christopher S. Pedicini, Canton, both of Ga.

[73] Assignee: AER Energy Resources, Inc., Smyrna, Ga.

[21] Appl. No.: 858,582

[22] Filed: May 19, 1997

[51] Int. Cl.⁶ ............................. H01M 2/12; H01M 12/06
[52] U.S. Cl. ........................... 429/27; 429/82; 429/151; 429/153
[58] Field of Search .................. 429/27, 82, 148, 429/151, 153, 156; 29/623.4

[56] References Cited

U.S. PATENT DOCUMENTS

| | | | |
|---|---|---|---|
| 4,390,384 | 6/1983 | Turner | 156/221 |
| 4,397,917 | 8/1983 | Chi et al. | 429/26 |
| 4,416,955 | 11/1983 | Chi | 429/26 |
| 4,505,992 | 3/1985 | Dettling et al. | 429/36 |
| 4,592,972 | 6/1986 | Juergens et al. | |
| 4,732,637 | 3/1988 | Dettling et al. | 156/295 |
| 4,818,640 | 4/1989 | Fukuda et al. | 429/38 |
| 4,973,532 | 11/1990 | Taskier et al. | 429/62 |
| 5,035,045 | 7/1991 | Bowen et al. | 29/623.2 |
| 5,063,123 | 11/1991 | Ohsuga et al. | 429/38 |
| 5,114,767 | 5/1992 | Berns et al. | 428/35.7 |
| 5,288,565 | 2/1994 | Gruenstern | 429/153 |
| 5,328,541 | 7/1994 | Usui et al. | 156/304.2 |
| 5,328,777 | 7/1994 | Bentz et al. | 429/27 |
| 5,387,477 | 2/1995 | Cheiky | 429/26 |
| 5,510,203 | 4/1996 | Hamada et al. | 429/151 X |
| 5,560,999 | 10/1996 | Pedicini et al. | 429/27 |
| 5,569,551 | 10/1996 | Pedicini et al. | 429/27 |
| 5,626,990 | 5/1997 | Miller et al. | 429/153 X |
| 5,639,568 | 6/1997 | Pedecini et al. | 429/27 |

FOREIGN PATENT DOCUMENTS

| | | |
|---|---|---|
| 0 673 076 A1 | 9/1995 | European Pat. Off. |
| 2 673 488-A1 | 2/1992 | France. |
| 1805819 | 7/1969 | Germany. |
| 04249062 | 4/1992 | Japan. |
| WO 93/19495 | 9/1993 | WIPO. |
| WO 94/25995 | 11/1994 | WIPO. |

OTHER PUBLICATIONS

U.S. application No. 08/543,558, filed Oct. 16, 1995, Christopher S. Pedicini et al.

*Primary Examiner*—Stephen Kalafut
*Attorney, Agent, or Firm*—Jones & Askew, LLP

[57] ABSTRACT

Provided are metal-air cells that each include a plurality of protruding connector members and a plurality of protruding mechanical stops. Two or more of the cells are joined to create a battery stack. Two cells are joined by heating connector members of the cells, and then forcing the cells together so that the connector members of one cell are welded or fused to connector members of the other cell. During the fusing of the connector members, the mechanical stops of the cells being joined abut one another to arrest movement of the cells toward one another. The arresting causes a plenum to be uniformly defined between the cells. The fused connector members and abutting mechanical stops cooperate to define three-dimensional truss-like system that provides structural integrity. Each of the metal-air cells have a case with an exterior surface and an interior surface that defines a chamber that contains an anode and air cathodes. The case defines air openings that extend between the exterior surface and the interior surface for supplying air from the environment exterior to the case to the air cathodes within the chamber. Connector members and mechanical stops are preferably integrally formed with their case, interspersed with the air openings, and arranged in arrays.

29 Claims, 4 Drawing Sheets

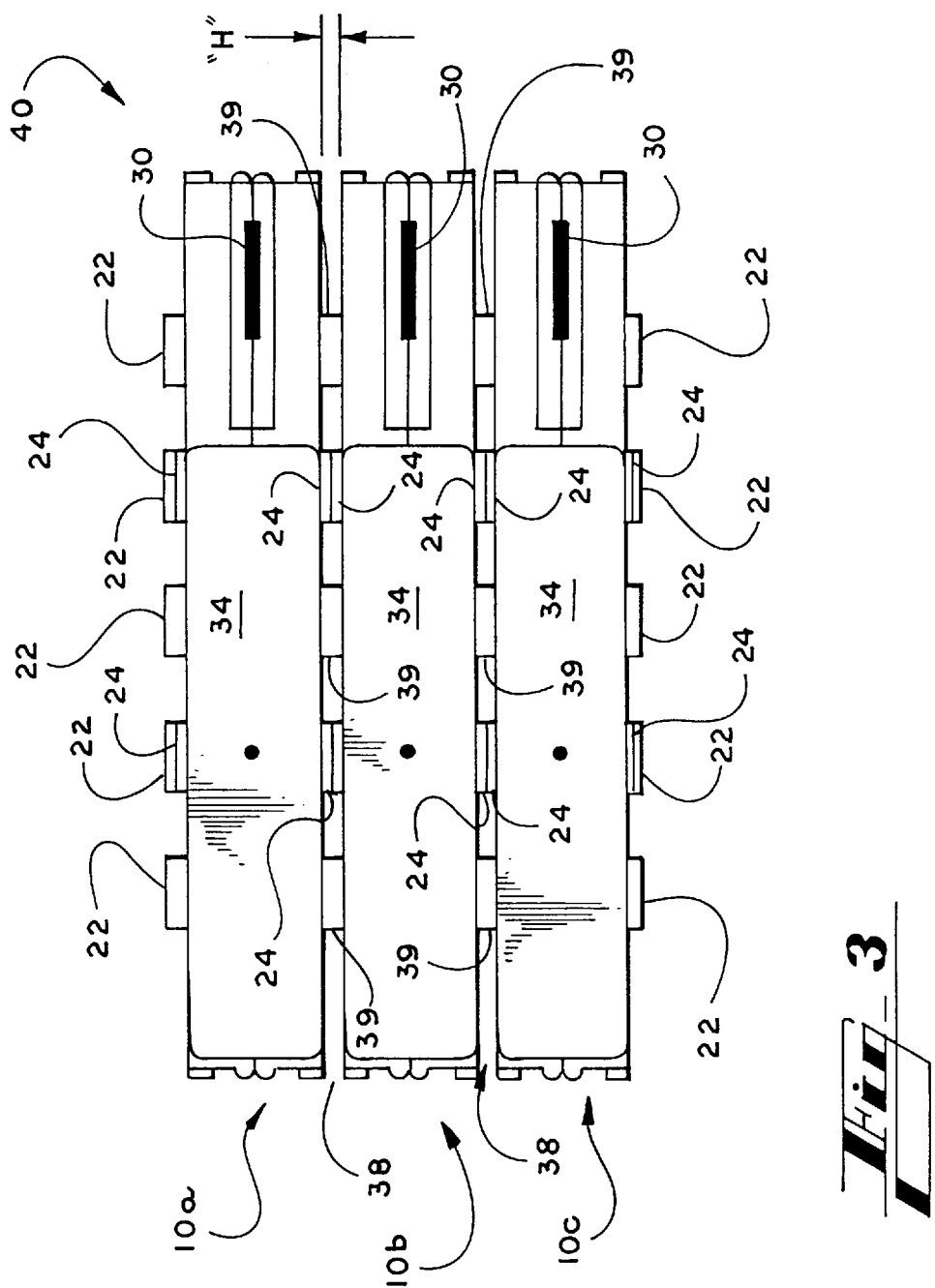

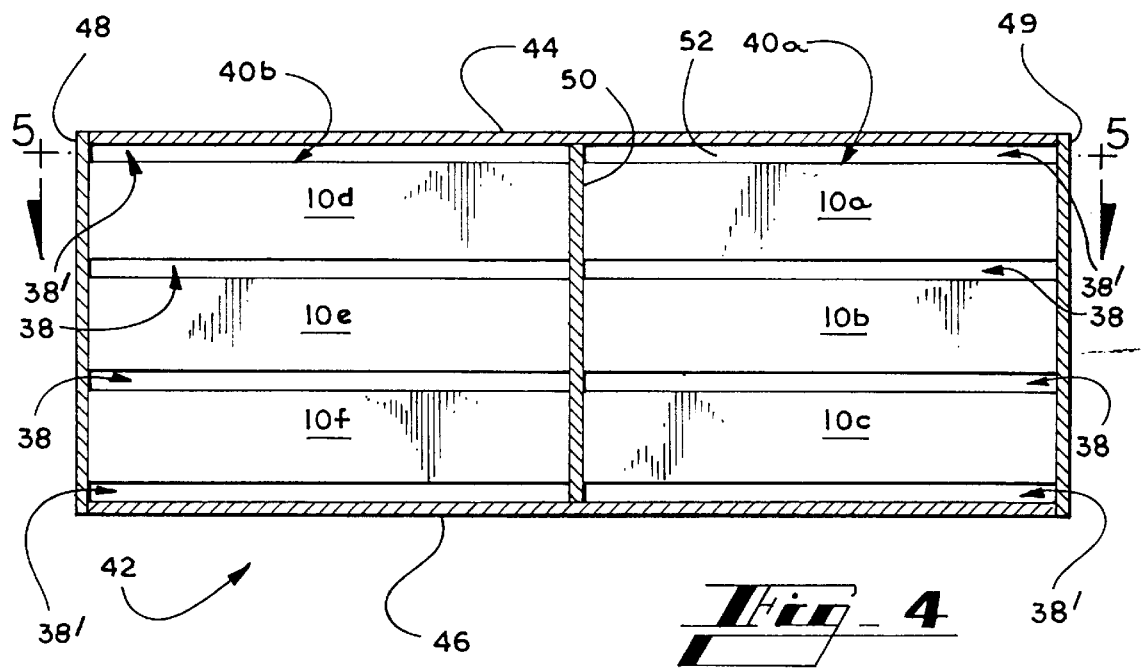
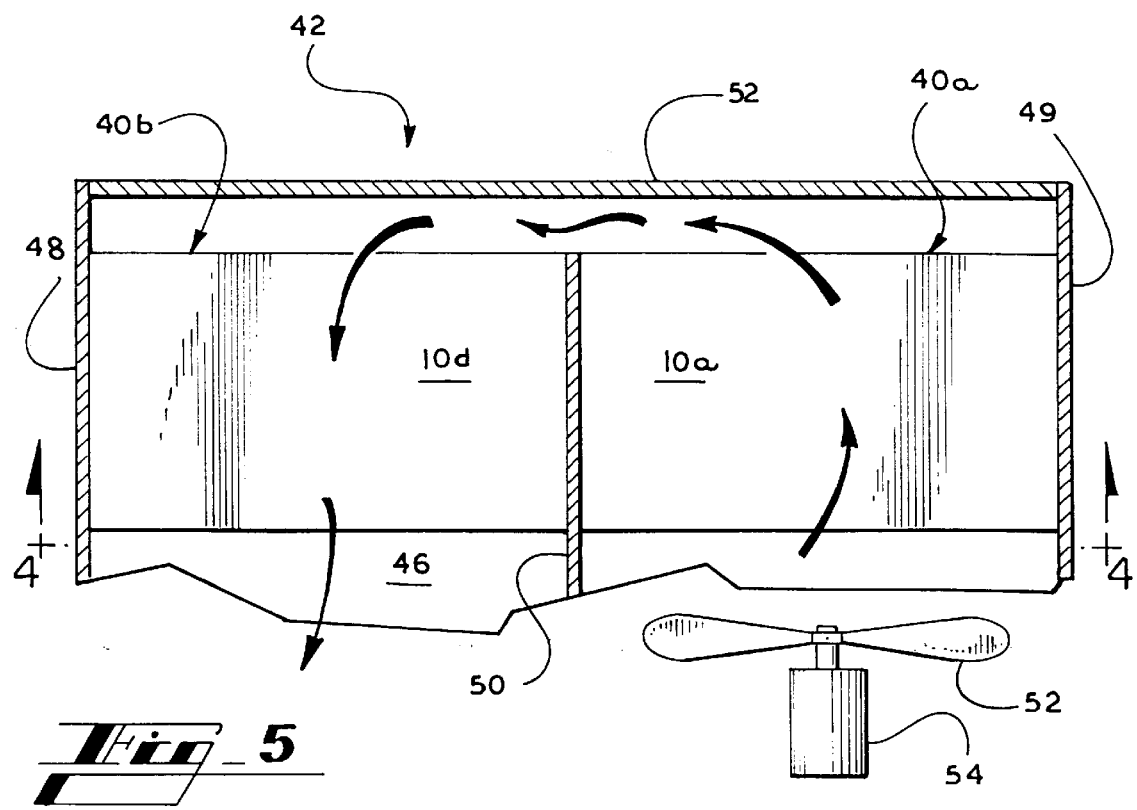

METHOD AND APPARATUS FOR JOINING METAL-AIR CELLS

TECHNICAL FIELD

The present invention relates generally to metal-air cells, and more particularly relates to connecting metal-air cells to form a battery stack.

BACKGROUND OF THE INVENTION

Metal-air cells include one or more air permeable cathodes and a metallic anode that are separated by an aqueous electrolyte. During discharge of a metal-air cell, such as a zinc-air cell, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from ambient air as a reactant in the electrochemical reaction rather than a heavier material such as a metal or metallic composition. Metal-air cells are often arranged in stacks within a common housing to provide a sufficient amount of power output. The result is a relatively light-weight battery.

Both primary and secondary metal-air batteries have been developed. A rechargeable metal-air cell is recharged by applying voltage between the anode and the cathode of the cell and reversing the electrochemical reaction. Oxygen is discharged back to the atmosphere through the air-permeable cathode. Examples of rechargeable metal-air cells having an anode positioned between two air cathodes are disclosed in U.S. Pat. No. 5,569,551 and U.S. patent application Ser. No. 08/543,558, the disclosures of which are incorporated herein by reference.

Problems common to rechargeable metal-air cells include cell swelling and anode relocation. Anode relocation contributes to capacity loss, operating voltage loss, and may cause an imbalance in current distribution between the cathodes. Although known designs have decreased the problem of anode relocation, further improvements can be made to further decrease capacity loss, operating voltage loss, and imbalances in current distribution between the cathodes.

One phenomenon that contributes to anode relocation is cell swelling. Cell swelling can occur, for example, during the initial discharge cycle of a cell. During a discharge cycle, oxygen is drawn into the cell. When the anode is discharged the volume of the discharge products is roughly twice the volume of the zinc metal. If a cell case is not properly constrained during this reaction, the cell case can swell. As a result, when the electrochemical reaction in the cell is reversed by recharging, the zinc anode can re-form in a distorted space within the cell. This can cause the shape of the anode to become distorted.

While conventional techniques for restraining cells attempt to preclude cell swelling and the resulting anode distortion, some cell swelling and anode distortion can still occur. For example, glues that are used to hold cells often fail due to the forces associated with cell swelling. An additional problem experienced with metal-air cells pertains to the mechanical brackets and spacers that are commonly used to restrain cells. It can be difficult and labor intensive to install certain types of these brackets and spacers.

Accordingly, there is a need for metal-air cells that can be joined in a manner that seeks to preclude cell swelling. Decreased cell swelling will result in decreased anode relocation, and will provide cells with increased power output, without compromising the efficiency and life of the cells.

SUMMARY OF THE INVENTION

The present invention seeks to provide metal-air cells and a method for joining those cells that prevents cell swelling, increases the structural rigidity and integrity of the cells, decreases anode relocation, provides increased power output without compromising the efficiency and life of the cells, and maintains the size of plenums defined between cells.

In accordance with the present invention, this object is accomplished by providing metal-air cells that include protruding connector members and protruding mechanical stops that are distributed over broad surface areas of the cells. This object is further accomplished by joining the cells so that their connector members and their mechanical stops provides a three dimensional, truss-like connection between the cells. Two cells are joined by heating connector members of the cells, and then forcing the cells together so that the connector members of one cell are welded or fused to connector members of the other cell, and the mechanical stops of one cell abut the mechanical stops of the other cell.

The cells are joined so that the fused connector members extend through an air space, or plenum, defined between the two cells. During the fusing of the connector members, the mechanical stops of the cells being joined abut one another to arrest movement of the cells toward one another. The arresting causes the plenum to be uniformly defined between the cells. Two or more cells can be joined to create a battery stack, and a plenum is defined between each pair of neighboring cells in the battery stack.

More particularly, each of the metal-air cells have a similar outer case. Each case has an exterior surface and an interior surface that defines a chamber that contains an anode and air cathodes. The case further defines air openings that extend between the exterior surface and the interior surface for supplying air from the environment exterior to the cover to the air cathodes within the chamber. For each case, the connector members and mechanical stops are interspersed with the air openings, arranged in arrays, and extend away from the exterior surface of the case. Each case includes a pair of oppositely oriented covers, and connector members and mechanical stops are preferably integrally formed with each of the covers.

Other objects, features and advantages of the present invention will become apparent upon reviewing the following description of preferred embodiments of the invention, when taken in conjunction with the drawings and the appended claims.

BRIEF DESCRIPTION OF THE DRAWINGS

FIG. 3 is a side elevational view of three metal-air cells of the type depicted in FIG. 1, which have been joined to form a battery stack.

FIG. 4 is a side cross-sectional view of an air manager that is housing two battery stacks of the type depicted in FIG. 3, taken along line 4—4 of FIG. 5.

FIG. 5 is a partially cut-away, top cross-sectional view of the air manager of FIG. 4, taken along line 5—5 of FIG. 4.

DETAILED DESCRIPTION OF THE INVENTION

Figure 1:
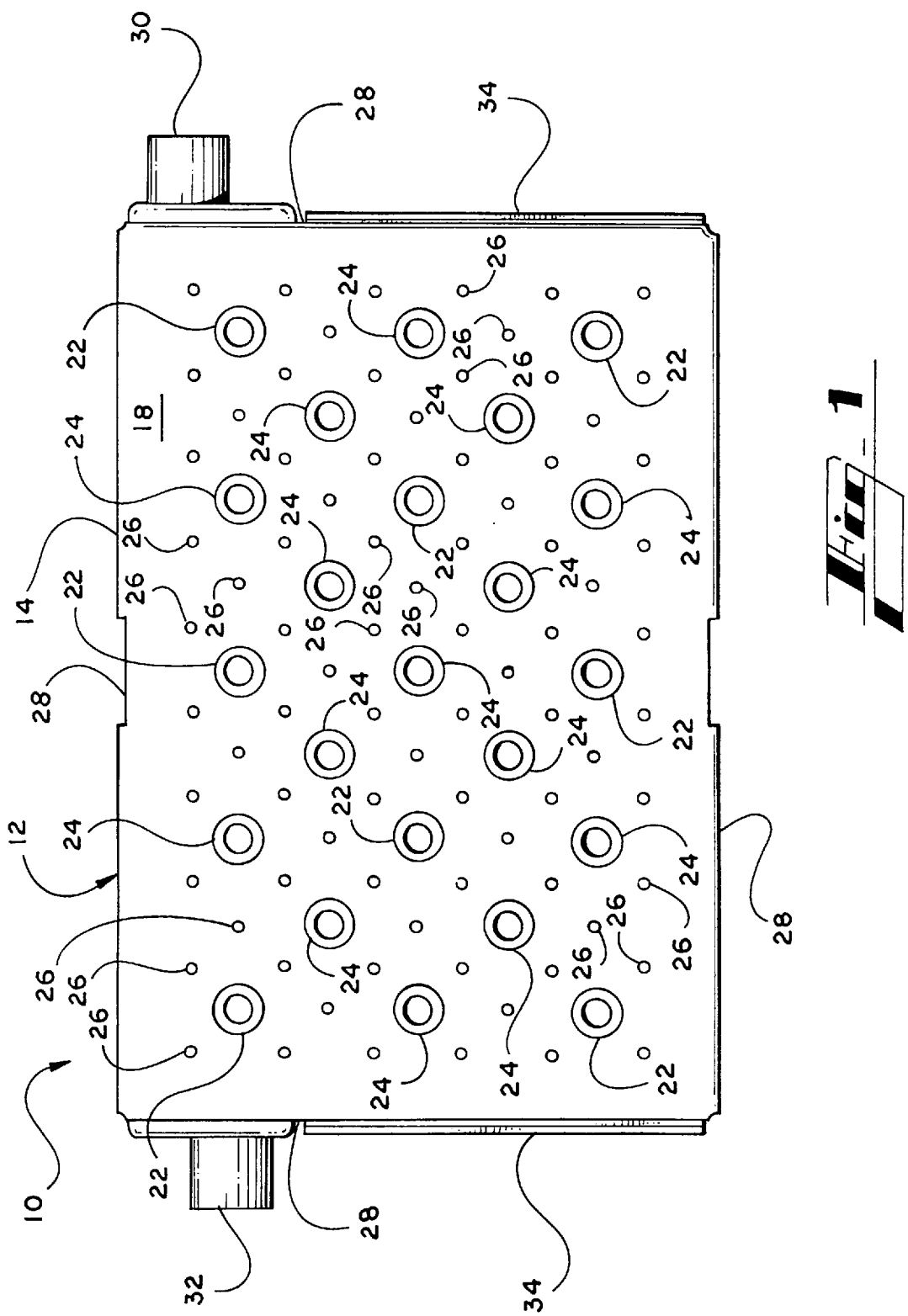
FIG. 1 is a plan view of a metal-air cell that includes multiple protruding connector members and mechanical stops, in accordance with the present invention.
Figure 2:
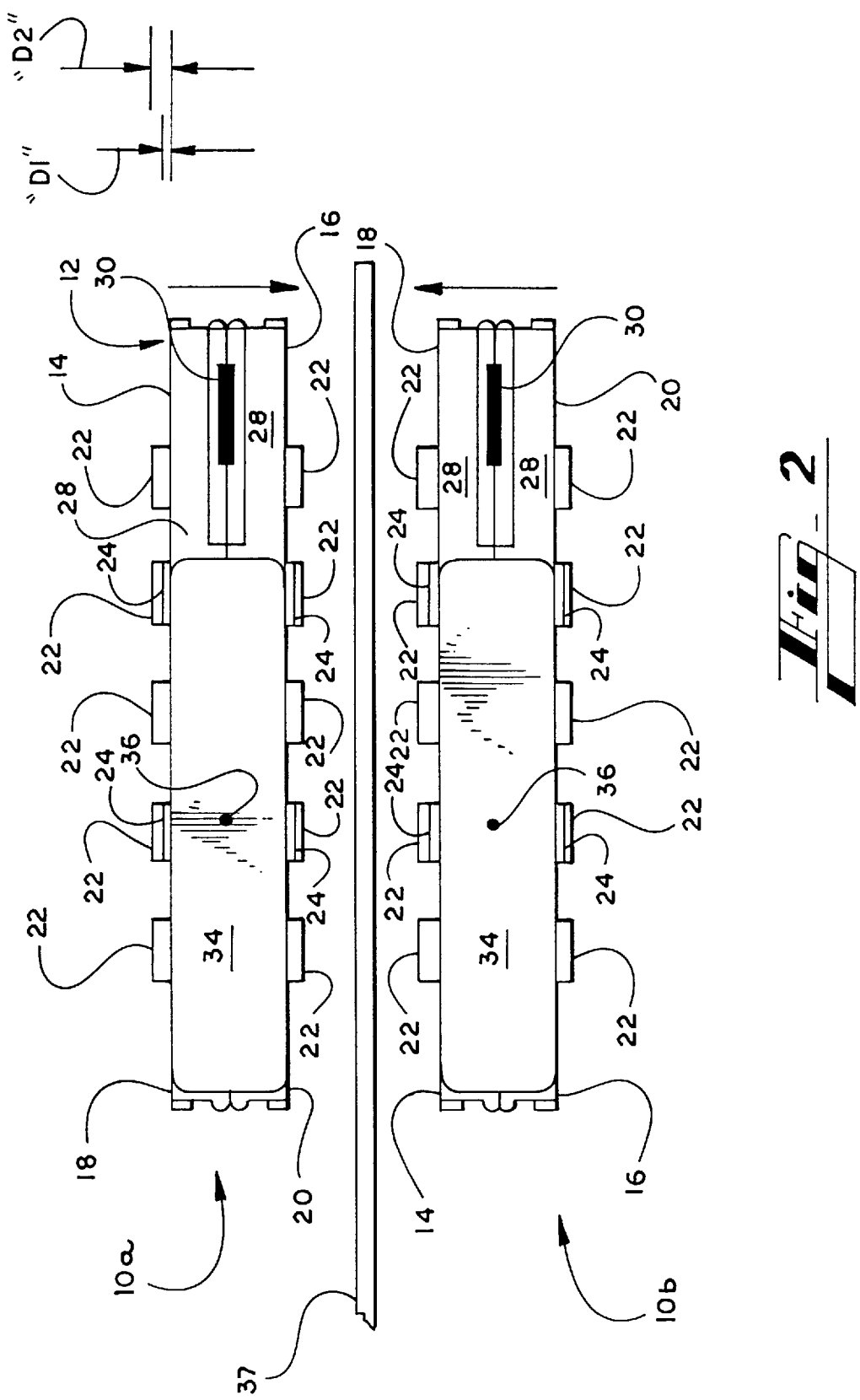
FIG. 2 is a side elevational view of two metal-air cells of the type depicted in FIG. 1, which are in the process of being joined.

Referring now to the drawings in which like numerals indicate like elements throughout the several views, FIG. 1 depicts the external elements of a metal-air cell 10, and FIG. 2 depicts the external elements of metal-air cells 10a, 10b. In the remaining FIGS. 3–5, metal-air cells 10c–10f are depicted. Throughout this disclosure, it should be understood that each of the cells 10–10f are generally identical, except for slight modifications that occur when one cell is connected to another, as will be discussed in greater detail below. Therefore, unless indicated otherwise, discussion of the cell 10 should be understood to pertain to each of the cells 10a–10f.

FIG. 1 is a top plan view of the cell 10, and a bottom plan view of the cell 10 is a mirror image of the top plan view. FIGS. 2 and 3 are side elevational views of cells 10, and views of those cells 10 from the opposite sides are mirror images of the provided side elevational views, except for the arrangement of the cathode tabs 30 and anode tabs 32 (FIG. 1).

Referring to FIGS. 1 and 2, each cell 10 includes a case 12 that includes an upper cover 14 joined to a lower cover 16 (FIG. 2). The upper cover 14 includes an upper cathode mask wall 18, and the lower cover 16 includes a lower cathode mask wall 20 (FIG. 2). Each of the cathode mask walls 18, 20 include an interior surface and an exterior surface. Multiple protrusions, which are referred to as connectors 22 and stops 24, extend perpendicularly from the exterior surface of each of the cathode mask walls 18, 20. As will be discussed in greater detail below, the connectors 22 and stops 24 are used to join one metal-air cell 10 to another, as indicated by FIGS. 2 and 3. Connectors 22 and stops 24 are distributed over the exterior surface area of each of the cathode mask walls 18, 20 in a manner that seeks to allows the cells 10 to be easily joined and prevent cell swelling.

Each of the connectors 22 and stops 24 are annular and extend from their respective cathode mask wall 18, 20 so that they are in the form of cylinders. The axes of those cylinders are perpendicular to the respective cathode mask walls 18, 20. The connectors 22 and stops 24 are arranged in a two-dimensional array that includes a plurality of columns and rows. Each of the stops 24 includes a terminus that is a distance "D1" (FIG. 2) from its respective cathode mask wall 18, 20, and each of the connectors 22 includes a terminus that is a distance "D2" (FIG. 2) from its respective cathode mask wall 18, 20. Throughout this disclosure, the terminus of a connector 22 or stop 24 is that portion of the connector 22 or stop 24 that is most distant from the mask wall 18, 20 from which the connector 22 or stop 24 originates. The distance "D2" is greater than the distance "D1," and those distances are preferably 0.06 inches and 0.03 inches, respectively. For each cover 14, 16, the terminuses of the stops 24 protruding from that cover lie in a common first plane, and the terminuses of the connectors 22 protruding from that cover lie in a common second plane, and each of those planes are parallel to their respective mask walls 18, 20. Thus, for each cover 14, 16, the terminuses of the stops 24 can be characterized as cooperating to define a generally planar, first composite mounting surface, and the terminuses of the connectors 22 can be characterized as cooperating to define a generally planar, second composite mounting surface.

In accordance with a first exemplary embodiment of the present invention, with the exception of the connectors 22 and stops 24, the cells 10 are generally identical to the metal-air cells disclosed in U.S. Pat. No. 5,569,551, which has been incorporated by reference. In accordance with a second exemplary embodiment of the present invention, with the exception of the connectors 22 and stops 24, the cells 10 are generally identical to the metal-air cells disclosed in U.S. patent application Ser. No. 08/543,558, which has been incorporated by reference. Therefore, unless expressly indicated otherwise or apparent to those reasonably skilled in the art, the cells 10 should be understood to function and be constructed as disclosed in the documents incorporated by reference. As mentioned in those documents, each case 14, 16 is preferably molded from a light-weight plastic, such as polypropylene, that is not electrically conductive. The connectors 22 and stops 24 are preferably integrally formed with their respective cover 14, 16.

As discussed in the documents incorporated by reference, each cathode mask wall 18, 20 defines multiple air openings 26 that extend between the interior surface and the exterior surface of the respective cathode mask wall 18, 20. Only a select few of the air openings 26 are specifically pointed to in FIG. 1 in an effort to clarify the view. The number and arrangement of the openings 26 in the cells 10 of the present invention vary from the number and arrangement of the openings disclosed in the documents incorporated by reference. Eighty two openings 26 are depicted in FIG. 1. Further, each of the connectors 22 and stops 24 are generally surrounded by air openings 26, and the air openings 26 are interspersed with the connectors 22 and stops 24.

For each case 12, the interior surfaces of the cathode mask walls 18, 20 partially bound an internal chamber. That internal chamber is further defined by side walls 28 (FIG. 2) that extend from the interior surfaces of the cathode mask walls 18, 20. As also discussed in the documents incorporated by reference, each cell 10 includes within its internal chamber an anode positioned between a pair of air cathodes. For each cell 10, one of the cathodes is adjacent the interior surface of the mask wall 18 and communicates with the environment at the exterior surface of the mask wall 18 through the openings 26 defined through the mask wall 18. Similarly, for each cell 10, the other cathode is adjacent the interior surface of the mask wall 20 and communicates with the environment at the exterior surface of the mask wall 20 through the air openings 26 defined through the mask wall 20. Each cell 10 further includes a cathode tab 30 which is the positive terminal of the cell, and an anode tab 32 that is the negative terminal of the cell. Each cell 10 further includes a pair of vent caps 34, each of which includes a gas exit hole 36 (FIG. 2).

The manner in which cells 10 are joined is an important aspect of the present invention. In accordance with the present invention the cells 10 are joined in a manner that seeks to prevent cell swelling and anode relocation. More particularly, the cells 10 are joined by a three dimensional, truss-like system of fused connectors 22 and abutting stops 24 that provides structural integrity. As mentioned previously, the connectors 22 and stops 24 are preferably identically arranged on each cover 14, 16. Therefore, when the cells 10a, 10b are aligned and proximate to one another as depicted in FIG. 2, the downward facing connectors 22 of the cell 10a are aligned with the upward facing connectors 22 of the cell 10b. The stops 24 are arranged relative to the connectors 22 so that by aligning the connectors 22 as mentioned above, the downward facing stops 24 of the cell 10a are aligned with the upward facing stops 24 of the cell 10b.

When two cells such as the cell 10a and the cell 10b are to be joined, they are generally aligned as discussed above, and then moved toward a generally planar, broad hot plate 37. The hot plate 37 is heated to a temperature above the melting temperature of the connectors 22. Each of the cells 10a, 10b is moved toward the hot plate 37 so that the terminuses of the downward facing connectors 22 on the cell 10a and the terminuses of the upward facing connectors 22 on the cell 10b contact the hot plate 37 and are heated to above their melting temperature. It is preferable for the connectors 22 being heated not to be substantially deformed during contact with the hot plate 37. Therefore, only slight force is used to hold the cells 10a, 10b against the hot plate 37 so that the connectors 22 being heated are not substantially deformed. That is, it is desirable for the connectors 22 being heated to maintain their general shaped so that the associated stops 24 do not contact the hot plate 37 and are not heated above their melting point or deformed.

Once the desired connectors 22 are heated as discussed above, the cells 10a, 10b and the hot plate 37 are arranged so that the hot plate 37 is no longer positioned between the cells 10a, 10b. Then, while the cells 10a, 10b are aligned as discussed above, the cells 10a, 10b are moved together so that the terminus of each downward facing connector 22 of the cell 10a is aligned with and contacts a corresponding terminus of an upward facing connector 22 of the cell 10b. The cells 10a, 10b are forced together and continue to move toward one another as the heated connectors 22 deform and fuse together. Movement of the cells 10a, 10b toward one another is arrested when the downward facing terminuses of the stops 24 of the cell 10a abut the upward facing terminuses of the stops 24 of the cell 10b. As the cells 10a, 10b are forced toward one another, for each of the resulting pairs of connectors 22 (each pair consisting of one of the downward facing connectors 22 of the cell 10a and one of the upward facing connectors 22 of the cell 10b), their terminuses are welded or fused together such that they become a single support 39 (FIG. 3) that is connected between the cells 10a, 10b. The touching terminuses of the stops 24 do not fuse, but rather are maintained intact and rigid so that they function to arrest movement of the cell 10a toward the cell 10b so that an air space or plenum 38 (FIG. 3), which is of uniform height along its length and width, is defined between the cell 10a and the cell 10b.

Referring to FIG. 3, the cells 10a, 10b have been fused to one another by the above-discussed procedure. The height "H" of the plenum 38 defined between the cells 10a, 10b is equal to twice the distance "D1" depicted in FIG. 2. Any number of cells can be joined by repeating the above-disclosed fusing process. For example, in FIG. 3 a cell 10c has been fused to the bottom of the cell 10b to define a battery stack 40. Battery stacks 40 can include two or more cells.

FIGS. 4 and 5 are schematic, cross-sectional views of battery stacks 40a, 40b (each of which is generally identical to the battery stack 40 of FIG. 3) disposed within an exemplary air manager 42. FIG. 4 is a cross-sectional view of the air manager 42 from the reference of line 4—4 in FIG. 5. FIG. 5 is a cross-sectional view of the air manager 42 from the reference of line 5—5 in FIG. 4. FIG. 4 is schematic in nature because none of the connectors 22 (FIGS. 1–3), stops 24 (FIGS. 1–3), or supports 39 (FIG. 3) are shown, in an effort to clarify the view. The cells 10 can be utilized in different types of air managers, and the exemplary air manager 42 is presented only as one possible example. For example, the cells 10 can be used in the air manager disclosed in U.S. patent application Ser. No. 08/556,613, the disclosure of which is incorporated herein by reference. That air manager of that application includes a central fan defining a flow axis, and flow-paths extending from and returning to the flow axis that supply cells, such as cells 10a–10f in cell stacks 40a, 40b, on opposite sides of the flow axis.

The exemplary air manager 42 of FIGS. 4 and 5 includes an upper panel 44 (FIG. 4) and a lower panel 46 that are fixed with respect to one another. The upper panel 44 and the lower panel 46 of the air manager 42 extend between and are joined to side panels 48, 49. A partition panel 50 extends between the upper panel 44 and the lower panel 46 to separate the battery stack 40a from the battery stack 40b. A rear panel 52 (FIG. 3) spans between the upper panel 44, the lower panel 46, and the side panels 48, 49.

The tops and bottoms of the stacks 40a, 40b can be fused to or abutted against the upper panel 44 and the lower panel 46, respectively. The terminuses of the upward facing connectors 22 (FIGS. 1–3) of the cells 10a, 10d can be heated above their melting temperature by the hot plate 37 (FIG. 2), or some other means, and then be forced against the heated interior surface of the upper panel 44 so that those heated connectors 22 fuse to the upper panel 44. During that fusing, the terminuses of the upward facing stops 24 (FIGS. 1–3) of the cells 10a, 10d abut the panel 44 to arrest movement of the cells 10a, 10b relative to the upper panel 44 so that air spaces or plenums 38', which are of uniform height along their lengths and widths, are defined between the cells 10a, 10d and the upper panel 44. Alternatively, the terminuses of the upward facing connectors 22 of the cells 10a, 10d can remain at ambient temperature and be abutted to the upper panel 44 so that the terminuses of the upward facing stops 24 of the cells 10a, 10d do not contact the upper panel 44. Similarly, the terminuses of the downward facing connectors 22 of the cells 10c, 10f can be heated by the hot plate 37, or some other means, and then be forced against the heated interior surface of the lower panel 46 so that those heated connectors 22 fuse to the lower panel 46. During that fusing, the terminuses of the downward facing stops 24 of the cells 10c, 10f abut the lower panel 46 to arrest movement of the cells 10c, 10f relative to the lower panel 46 so that plenums 38', which are of uniform height along their lengths and widths, are defined between the cells 10a, 10d and the lower panel 46. Alternatively, the terminuses of the downward facing connectors 22 of the cells 10c, 10f can remain at ambient temperature and be abutted to the lower panel 46 so that the terminuses of the downward facing stops 24 of the cells 10c, 10f do not contact the lower panel 46. In accordance with aforementioned fusing procedures for forming the plenums 38', the heights of the plenums 38' are equal to the height "D1" (FIG. 2) of the stops 24. In accordance with aforementioned non-fusing procedures for forming the plenums 38', the heights of the plenums 38' are equal to the height "D2" (FIG. 2) of the connectors 22. Alternatively, special covers can be used on the tops the cells 10a, 10d and on the bottoms of the cells 10c, 10f to obtain different heights of the plenums 38'.

A fan, which is depicted toward the front of the air manager 42 and includes an impeller 52 driven by a motor 54, forces air into the fronts of the plenums 38, 38' of the battery stack 40a. The air-flow exits the rear of the plenums 38, 38' of the battery stack 40a, and then flows from rear to front through the plenums 38, 38' of the battery stack 40b, as indicated by arrows in FIG. 5.

It should be understood that the foregoing relates only to exemplary embodiments of the present invention, and that numerous changes may be made therein without departing from the spirit and scope of the invention as defined by the following claims.

What is claimed is:

1. A method of joining a first metal-air cell that comprises a two dimensional array of protruding first connecting members to a second metal-air cell, comprising the steps of:

fusing the connecting members to the second cell, the fusing step comprising the steps of heating the first connecting members and moving the first connecting members into contact with the second cell; and providing an air space between the first cell and the second cell, the providing step comprising the step of arresting the movement of the first cell toward the second cell with a plurality of first mechanical stops disposed between the first cell and the second cell.

2. The method of claim 1, wherein the method provides a rigid cell stack that substantially maintains the shape of chambers containing anodes so that anode relocation is substantially avoided.

3. The method of claim 1, wherein the first connecting members deform in response to the fusing step, and the deforming of the first connecting members is diminished by the arresting step so that the air space between the first cell and the second cell is uniform.

4. The method of claim 1, wherein the first mechanical stops are interspersed with the first connecting members, and wherein the first mechanical stops and the first connecting members are formed integrally with a cover of the first cell.

5. The method of claim 1, wherein the second cell comprises an array of protruding second connecting members, and wherein the fusing step comprises the step of aligning the first connecting members with the second connecting members so that terminuses of the first connecting members engage and fuse with terminuses of the second connecting members.

6. The method of claim 5, wherein the first mechanical stops extend from the first cell and a plurality of second mechanical stops extend from the second cell, and wherein the aligning step aligns the first mechanical stops with the second mechanical stops so that terminuses of the first mechanical stops abut terminuses of the second mechanical stops.

7. The method of claim 1, wherein the first cell comprises a first cover that defines a plurality of openings that are interspersed with the first connecting members and extend through the first cover for supplying air from the air space to a cathode of the first cell.

8. The method of claim 1, wherein the first metal-air cell comprises a cover comprising an exterior surface and an interior surface at least partially defining a chamber that contains an anode and an air cathode, the cover defining a plurality of openings extending between the exterior surface and the interior surface for supplying air from an air space adjacent the exterior surface to the air cathode, wherein the connecting members are integrally formed with the cover and extend from the exterior surface into the air space to a first distance from the exterior surface, and wherein the mechanical stops are integrally formed with the cover and extend from the exterior surface into the air space to a second distance from the exterior surface, wherein the first distance is greater than the second.

9. A metal-air battery, comprising:

a first cell comprising an exterior first surface;

a second cell connected to the first cell and comprising an exterior second surface that is distant from the first surface so that an air space is defined between the first surface and the second surface; and a two dimensional array of supports extending into the air space, each support defining a connection, which is formed by fusing, between the first cell and the second cell.

10. The method of claim 9, wherein the connection between the first cell and the second cell provides a rigid cell stack that substantially maintains the shape of chambers containing anodes so that anode relocation is substantially avoided.

11. The metal-air battery of claim 9, wherein the supports are arranged in a plurality of rows that are displaced from one another and distributed over an area of the first surface and the second surface, each row including supports that are displaced from one another.

12. The metal-air battery of claim 9, wherein the first cell further comprises a plurality of first protrusions interspersed with the supports and abutting the second cell.

13. The metal-air battery of claim 12, wherein the second cell further comprises a plurality of second protrusions interspersed with the supports and abutting the first protrusions.

14. The metal-air battery of claim 9, wherein the first surface defines a plurality of openings that are interspersed with the supports and extend through the first surface for supplying air from the air space to a cathode of the first cell.

15. The metal-air battery of claim 14, wherein the second surface defines a plurality of openings extending therethrough for supplying air from the air space to a cathode of the second cell.

16. The metal-air battery of claim 9, wherein the supports are first supports and the air space is a first air space, wherein the first cell further comprises an exterior third surface, and wherein the metal-air battery further comprises:

a third cell connected to the first cell and comprising an exterior fourth surface that is distant from the third surface so that a second air space is defined between the third surface and the fourth surface, and a two dimensional array of second supports extending into the second air space, each second support defining a connection, which is formed by fusing, between the first cell and the third cell.

17. A metal-air cell, comprising:

a case comprising an exterior surface and an interior surface at least partially defining a chamber that contains an anode and an air cathode, the case defining a plurality of openings extending between the exterior surface and the interior surface for supplying air from an air space adjacent the exterior surface to the air cathode;

a plurality of first protrusions connected to the exterior surface and extending into the air space to a first distance from the exterior surface; and a plurality of second protrusions connected to the exterior surface and extending into the air space to a second distance from the exterior surface, wherein the second distance is greater than the first distance.

18. The metal-air cell of claim 17, wherein the first protrusions, second protrusions, and openings are all interspersed with one another.

19. The metal-air cell of claim 17, wherein the case comprises a cover that is integrally formed with the first protrusions and the second protrusions.

20. The metal-air cell of claim 17, wherein the second distance is at least fifty percent greater than the first distance.

21. The metal-air cell of claim 17, wherein the first protrusions and the second protrusions are arranged in a two dimensional array.

22. The metal-air cell of claim 17, wherein protrusions of the first protrusions and the second protrusions are cylindrical.

23. A metal-air cell, comprising:
   a case comprising:
      an interior surface at least partially defining a chamber,
      an exterior surface, and
      a plurality of first protrusions integrally formed with the case and extending from the exterior surface, the first protrusions arranged in a plurality of rows that are displaced from one another and distributed over an area of the exterior surface, each row including some of the first protrusions that are displaced from one another; and
   an anode and a cathode disposed within the chamber.

24. The metal-air cell of claim 23,
   wherein the case defines a plurality of openings extending between the exterior surface and the interior surface for supplying air from an air space adjacent the exterior surface to the cathode within the chamber, and
   wherein the first protrusions are interspersed with the openings and extend into the air space.

25. The metal-air cell of claim 23, wherein the case and the first protrusions are constructed of plastic.

26. The metal-air cell of claim 23, wherein each first protrusion comprises a terminus distant from the exterior surface, the terminuses cooperating to define a substantially planar composite mounting surface.

27. The metal-air cell of claim 23,
   wherein the first protrusions extend in a first direction to a first distance from the exterior surface, and
   wherein the case further comprises a second plurality of protrusions that are interspersed with the first protrusions, integrally formed with the case, and extend in the first direction to a second distance from the exterior surface that is greater than the first distance.

28. The metal-air cell of claim 27,
   wherein the first protrusions each extend approximately 0.03 inches from the exterior surface, and
   wherein the second protrusions each extend approximately 0.06 inches from the exterior surface.

29. The metal-air cell of claim 27, wherein each row further includes some of the second protrusions that are displaced from one another.

\* \* \* \* \*